United States Patent
Van Zijl

(10) Patent No.: US 8,250,810 B2
(45) Date of Patent: Aug. 28, 2012

(54) PLANT SUPPORT AND METHOD FOR CULTIVATING A PLANT

(76) Inventor: Fred Van Zijl, Poeldijk (NL)

( * ) Notice: Subject to any disclaimer, the term of this patent is extended or adjusted under 35 U.S.C. 154(b) by 758 days.

(21) Appl. No.: 11/994,447

(22) PCT Filed: Jun. 30, 2006

(86) PCT No.: PCT/NL2006/050159
§ 371 (c)(1),
(2), (4) Date: Jan. 26, 2008

(87) PCT Pub. No.: WO2007/004879
PCT Pub. Date: Jan. 11, 2007

(65) Prior Publication Data
US 2008/0209806 A1 Sep. 4, 2008

(30) Foreign Application Priority Data
Jul. 1, 2005 (NL) .................................... 1029401

(51) Int. Cl.
*A01G 9/12* (2006.01)
*A01G 17/04* (2006.01)
(52) U.S. Cl. ............... 47/70; 47/45; 47/47; 47/44
(58) Field of Classification Search .............. 47/41.01, 47/44, 47, 45, 70
See application file for complete search history.

(56) References Cited

U.S. PATENT DOCUMENTS

| | | | |
|---|---|---|---|
| 548,508 A * | 10/1895 | Bjelland | 47/47 |
| 649,874 A * | 5/1900 | Payne | 47/41.11 |
| 1,916,305 A | 7/1933 | Brigham | |
| 2,083,526 A | 6/1937 | Rinker | |
| 2,083,678 A * | 6/1937 | Wilson | 47/47 |
| 2,874,496 A * | 2/1959 | Rakes | 40/457 |
| 4,074,461 A * | 2/1978 | Hirschman | 47/70 |
| 5,778,597 A * | 7/1998 | Klevstad | 47/47 |
| 5,987,815 A * | 11/1999 | Payr | 47/70 |
| 6,038,812 A * | 3/2000 | Belokin et al. | 47/41.01 |
| 6,128,854 A * | 10/2000 | Chaney | 47/39 |
| 6,302,368 B1 * | 10/2001 | Tsappi | 248/523 |
| 2006/0236602 A1 * | 10/2006 | Grunnah | 47/47 |

FOREIGN PATENT DOCUMENTS

| | | |
|---|---|---|
| DE | 8628454 | 1/1987 |
| GB | 02055 | 0/1913 |
| GB | 12899 | 0/1913 |
| GB | 2346789 | 8/2000 |
| JP | 06303851 A * | 11/1994 |

OTHER PUBLICATIONS

International Search Report of PCT/NL2006/050159 filed Jun. 30, 2006, date of mailing Jun. 6, 2007.

* cited by examiner

*Primary Examiner* — Son T Nguyen
(74) *Attorney, Agent, or Firm* — Young & Thompson

(57) ABSTRACT

Plant support consisting of a base and a spiral, fitted rotatably thereon and extending vertically. This spiral is made for accommodating therein the main stem of a plant, such as pepper, cucumber, aubergine or tomato. Branches of the plant extend outwards to beyond the spiral. In the spiral is a stationary post. If the plant has reached the top of the spiral, the spiral is rotated with respect to the base such that the plant shifts downwards without rotating. The plant can subsequently continue to grow upwards again. A number of plant supports of this type can be combined with a common drive.

12 Claims, 4 Drawing Sheets

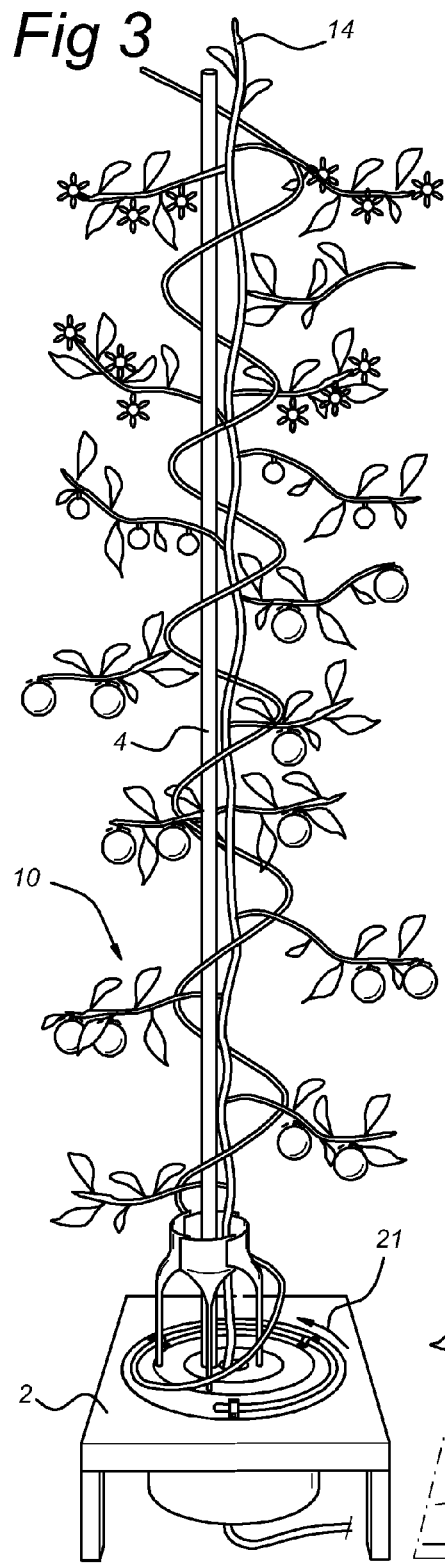
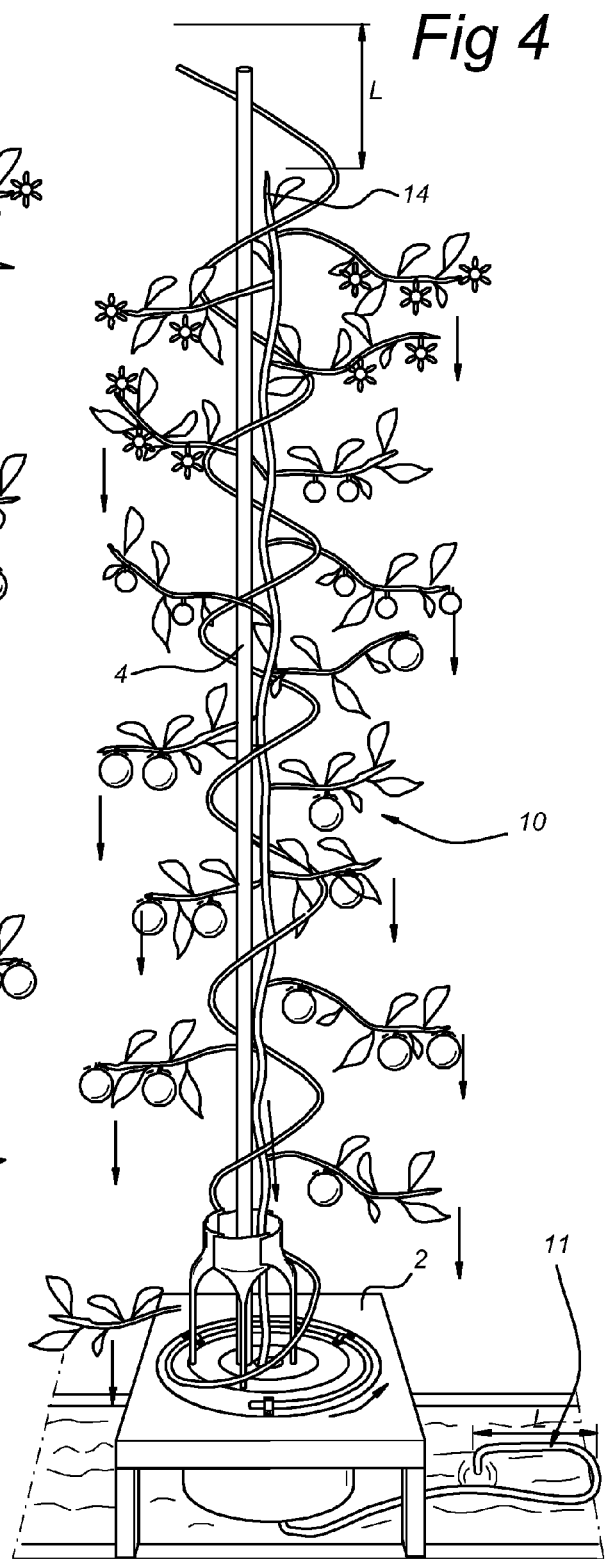

PLANT SUPPORT AND METHOD FOR CULTIVATING A PLANT

The present invention relates to a plant support comprising a spiral-shaped part, substantially extending vertically in the condition of use, and also a receptacle for the lower part of said plant.

A plant support of this type is disclosed in GB 2346789. This shows a spiral extending vertically in the position of use, which is held in the "outstretched state" by a post extending therein. Spiral and post are placed in a fixed position in a pot. A plant can extend upwards from the pot along the spiral.

GB-2055 A.D. 1913 discloses a spiral to be placed in a pot, which is supported on a vertical support. The spiral is fixed non-rotatably in the substrate in the pot with hooks.

When specific crops are grown, such as peppers, cucumbers, aubergines, tomatoes and other supported plants, the fruit is always developed near the end of the main stem and removed from there. The main stem subsequently continues to grow and new growth develops at a subsequent location on the main stem. As a result the length of the main stem continually increases.

When such crops are grown in glasshouses it is usual to hang the free end of the plant with a vertically extending thread on a thread extending horizontally which is tensioned in the glasshouse. Because of rapid growth of the end of the plant it is continually necessary to adjust the position of the end of the plant with respect to the horizontal thread.

In the state of the art many options are proposed for avoiding the complicated winding together of thread and plant. However, all the methods have proved to be particularly labour-intensive and require considerable training of the staff concerned, since if the plant becomes trapped, there will no longer be any fruit development.

It is the aim of the present invention to provide a plant support which provides a construction in which the free end of the plant should remain approximately in the same position while the main stem of the plant grows particularly quickly. Moreover, it is intended to achieve the "moving back" of the free end of the plant in a simple manner. On the one hand this needs to be able to be carried out by an operation which takes little time, and on the other hand it must be simple enough for untrained staff also to be able to carry out this operation.

The above objectives are achieved with an above-described plant support in that the spiral-shaped part comprises a longitudinal axis and in the condition of use is rotatable about said longitudinal axis with respect to the receptacle.

According to the present invention the spiral is rotatable with respect to the surroundings, in other words the receptacle. All this is carried out such that the plant located inside the spiral substantially carries out a vertical downward movement during rotation. In other words, the plant that has grown in the spiral with the aid of the branches is screwed back by the rotation of the spiral, producing new space again in the vertical direction for the plant to grow upwards. This rotating back of the plant by rotation of the spiral is a particularly simple operation. The plant itself seeks the best support point of, for example, the side branches, with the spiral, so there is no need to fear damage to the plant.

According to an advantageous embodiment of the invention the spiral is fitted to a stationary base via a bearing. Because of this stationary base the plant can stretch out. The bottom part of the plant, which primarily acts as root part, can be accommodated in a holder or in a substrate or suchlike.

According to a particularly advantageous embodiment of the invention it is aimed to adapt the site of the root of the bottom part of the plant during growth. In other words efforts are made to keep the total vertical length of the plant constant by moving a certain point of the plant downwards in the spiral and relocating the site of the root with respect to the spiral.

According to a particular embodiment of the invention the rotating of the plant with the spiral is prevented by plant retainers. After all, the spiral according to the present invention may have a considerable length, for example between 1-6 m or more, in particular approximately 2-4 m. According to a particular embodiment of the invention such plant retainers comprise a post extending substantially vertically or parallel to the spiral. This post is preferably fitted in the interior space of the spiral.

The spiral is preferably made such that the pitch thereof is constant. According to an advantageous embodiment this pitch is approximately 15-20 cm. This choice is partly determined by the location of the branches of the plant.

Optimum freedom of movement of the main stem and good anchoring opportunities for the side branches are obtained if the interior of the spiral is cylindrical. A cylinder with a diameter of between 1-10 and in particular 2-5 cm is preferably delimited in the interior of the spiral. The top end of the spiral may possibly be made as tapering outwards or inwards. In the first case the plant is easily centred and in the second case the plant has maximum support.

According to the present invention cutting elements can also be fitted. These cutting elements are preferably stationary and are located close to the outer periphery of the spiral. When the spiral is screwed back, the side branches of the plant move automatically along the cutting elements or are guided along them. Cutting elements of this type are present in particular near the bottom end of the spiral, where in general the most fully-grown part of the plant is located. Consequently when the plant moves downwards a cutting operation can automatically take place, whereby the fruits are collected. Moreover, it is possible to fit further constructions at those locations to collect and remove the growth. A cutting element of this type can extend along the entire periphery of the spiral or along only one part thereof. Moreover, a cutting element of this type is made such that the central position of the plant is preserved when the parts projecting therefrom are cut.

From the above it can be seen that the spiral needs to consist of a material on which on the one hand the side branches of the plant can be well supported. On the other hand it needs to be flat, such that movement of the spiral with respect to the plant is possible in an easy manner. For this purpose the spiral may consist of any material known in the state of the art which meets the above requirements. It has been found that stainless steel is one of the materials that produces satisfactory results. However, it is also possible to use types of steel, coated or otherwise, plastic spirals and suchlike.

The present invention also relates to an assembly consisting of a number of the above-described plant supports. In this embodiment driving is no longer done from spiral to spiral but via a common drive.

The invention relates moreover to a method for cultivating a plant, comprising the provision of a plant support with a spiral, extending vertically in the position of use, guiding the main stem of said plant through into the space extending into the interior of said spiral, while allowing branches of the plant to extend to outside said spiral, wherein once said plant has grown in said spiral to a specific height, said spiral is rotated while said plant is retained such that the plant moves downwards.

It should be understood that application of the invention is not confined to the above-mentioned plants, but also relates to all plants, whether or not cultivated for yielding fruits with the present invention.

The invention will be explained in more detail below with reference to an illustrative embodiment depicted in the drawings. In the drawings:

FIG. 3 shows the plant support according to FIG. 2 when the plant has reached the top of the spiral;

FIG. 4 shows the plant support according to the invention when the plant has been moved back.

Figure 1:
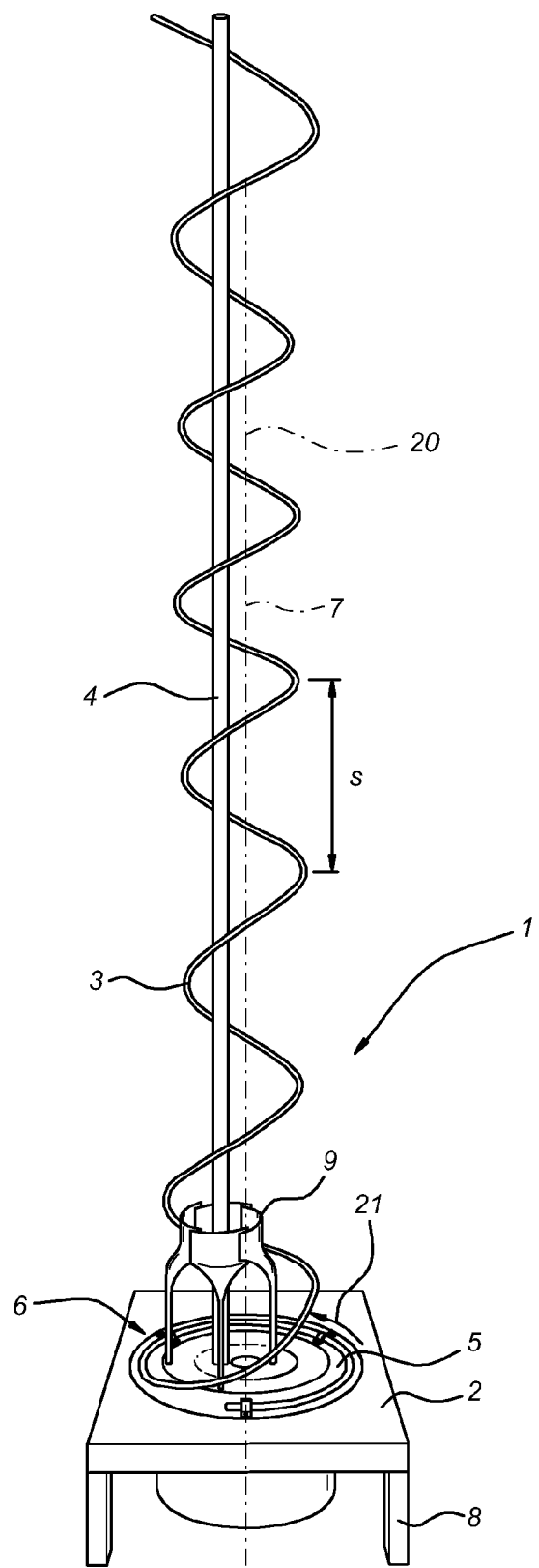
FIG. 1 shows the plant support according to the invention diagrammatically in perspective.

In FIG. 1 the plant support according to the present invention is indicated by 1. It consists of a base 2 with feet 8. The bottom end 6 of a spiral 3 is held rotatably on the base 2 via a bearing 5. This spiral 3 has a rotational axis 20. On rotation according to arrow 21 a point located on the spiral, which does not rotate with the spiral, will move downwards. The spiral has a substantially constant pitch between the various windings and this is indicated by s. The pitch is here approximately 18 cm. In the interior of the spiral a cylinder with a diameter of approximately 3 cm is delimited. The top end of the spiral, indicated by 7, tapers slightly outwards. As is clear, there is a vertically extending post 4 inside the spiral. This is firmly fixed to the base. The post 4 can extend as far as the top end of the spiral or possibly be made slightly shorter, because the top end of the plant needs to be positioned/supported to a lesser extent. It can of course also be made longer than the spiral for a particular reason.

There is a cutting blade 9 extending round the central stem of the plant. It is made such that the central stem of the plant is centred therein without being damaged, while parts projecting from it are subjected to the effect of the free cutting edge of the cutting blade 9.

Figure 2:
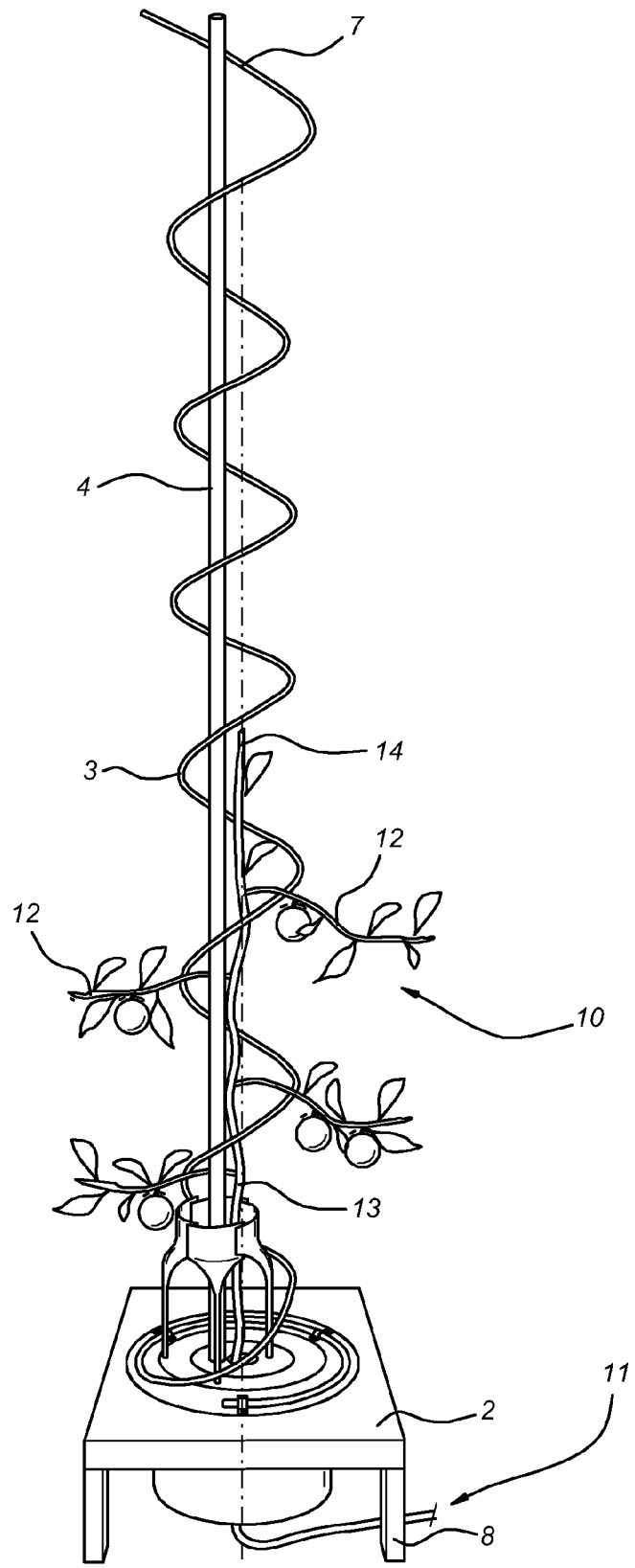
FIG. 2 shows a plant support according to the present invention just after a plant has been inserted.

FIG. 2 shows the situation where a plant 10 is fitted into the interior of the spiral. The plant 10 consists of a main stem 13 with side branches 12 extending therefrom. The top of the plant is indicated by 14. The root part, which is accommodated in the soil, a holder, substrate or suchlike in a way not illustrated in detail, is indicated by 11. Peppers, cucumbers and tomatoes, for example, will develop fruit on the side branches 12.

Starting from the situation shown in FIG. 2 where the plant 10 is supported with the side branches on the spiral, the main stem 13 will continue to develop inside the spiral. The surface of the spiral is so small that it hardly influences the light incidence. The plant will continue to grow so that ultimately the situation arises as illustrated in FIG. 3. Here the top 14 of the plant is located near the top end 7 of the spiral. Because the fruits of the plant are also located in the end part of the plant, at that moment it is desirable to move the plant downwards. This can be done according to the present invention in a particularly simple manner by rotating a spiral in the direction of arrow 21. Because of the presence of the post 4, when the spiral 3 rotates the plant 10 will not rotate with it. Consequently the top 14 of the plant will move downwards and the situation shown in FIG. 4 arises. The plant is in this case moved downwards by a length L. It should be understood that the root part 11 must be moved by an equal distance to the right in the drawing.

When the top of the plant 14 is rotated downwards the lower part will also move downwards. Specific side branches will then move in the vertical direction along the cutting blade 9 (FIG. 1) and in this way growth can automatically be cut off. All this can also be done by hand by additionally pulling the fruits concerned downwards.

If the site of the root is moved in the direction to the left at a distance L in a way known in the state of the art, this means that no special measures have to be taken near the location of the root. In all other cases measures do need to be taken, but these are generally known in the state of the art for cultivating plants such as peppers, cucumbers and tomatoes which need to be supported while they are growing.

Figure 5:
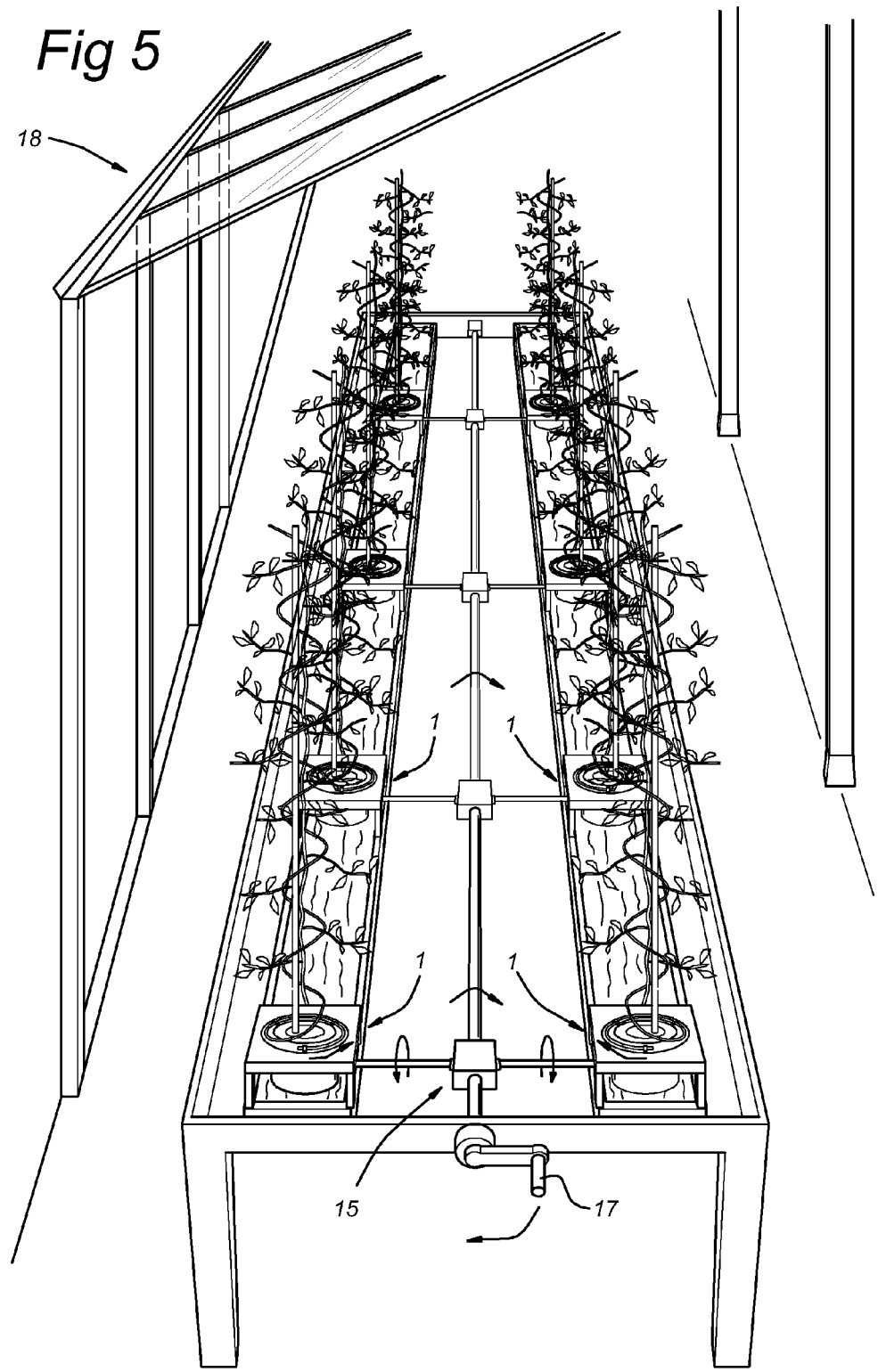
FIG. 5 shows the construction according to the invention.

In FIG. 5 a glasshouse is indicated as a whole by 18. A number of plant supports 1 next to one another and behind one another is installed therein. A common drive 15 is present, provided with a number of transverse drives. These drives can be executed in any way known in the state of the art. In this way it is possible with simple operation of handle 17 to rotate a large number of plant spirals at the same time with the effect described above.

Instead of the above-described cutting blades 9, fitted comparatively low, it is possible to carry out cutting at a higher level, for example 0.5 m from the bottom. For this purpose a construction can be fitted as stationary with a post. There are one or more cutting blades on such a construction.

In the way described above the growth in length of specific plants can very easily be compensated for without a laborious specialist operation being necessary.

After the above, variants which are within the above concept of the invention and consist of combinations of known techniques and that which is described in the appended claims will clearly occur to those skilled in the state of the art. Moreover, it must be understood that the various measures described in the subordinate claims can be applied both in combination with the independent claims and independently, in other words without combination with the previous independent claims.

The invention claimed is:

1. A device comprising:
    a plant receptacle for a bottom part of a plant; and
    a plant support, said plant support comprising:
    a spiral-shaped part, substantially extending vertically in a condition of use,
    said receptacle, for the bottom part of said plant, comprises a base fitted under the spiral-shaped part,
    said spiral-shaped part comprising a longitudinal axis said spiral-shaped part being in the condition of use is rotatable about said longitudinal axis with respect to the base and a bearing is provided between said spiral-shaped part and said base, and
    a post within said spiral-shaped part, substantially parallel to said longitudinal axis, wherein a main stem of said plant extends along said post and is displaceable in length direction of said post relative to said post, and side branches of said main stem engaging said spiral,
    wherein through rotation of said spiral relative to the base and about the stem, the stem being free of rotation, said displacement of the stem in the length direction is effected.

2. The device according to claim 1, wherein the spiral-shaped part has a substantially constant pitch (s).

3. The device according to claim 2, wherein the pitch (s) is 15-20 cm.

4. The device according to one claim 1, wherein an interior of the spiral-shaped part is cylindrical.

5. The device according to claim 4, wherein the cylinder has a diameter of 1-10 cm and is delimited within the spiral-shaped part.

6. The device according to claim 1, wherein the spiral-shaped part comprises a stainless steel.

7. The device according to claim 1, comprising cutting elements fitted at a stationary height.

8. The plant device to claim 1, wherein said spiral-shaped part comprises a length of 1-6 m.

9. The device according to claim 1, wherein said plant has a stem which extends upward through a hole in a center of said base along said longitudinal axis with respect to the base.

10. A plant support for a plant having a stem and side branches, said plant support comprising:
- a spiral-shaped part comprising a longitudinal axis, the side branches of the plant engaging said spiral-shaped part;
- a receptacle for a bottom part of said plant, said receptacle comprising a base fitted under the spiral-shaped part, in a use condition, said spiral-shaped part extending substantially vertically and being rotatable about said longitudinal axis with respect to said base;
- a bearing provided between said spiral-shaped part and said base; and
- a post located within said spiral-shaped part and substantially parallel to said longitudinal axis, the stem of said plant extending along said post,
- wherein through rotation of said spiral-shaped part relative to the base, the stem of the plant being free of rotation, the stem of the plant is displaced in a length direction of said post relative to said post.

11. A device for supporting and cutting a plant, comprising:
- a base from which a plurality of legs extend downward, the base having a hole therein for a stem of the plant to extend through in an upward longitudinal direction;
- a post affixed to the base, said post extending upwards from the base in a longitudinal direction parallel to the stem of the plant;
- a spiral-shaped part fixed to the base and extending upwards around the post and the stem; and
- a cutting device affixed to the base through a center of which the post and stem of the plant extend,
- wherein rotation of the base in a direction of the upward extension of the spiral-shaped part causes downward pressure by the spiral-shaped part upon branches of the plant bringing the branches in contact with a cutting surface of the cutting device,
- wherein the stem remains stationary while the base rotates.

12. The device for supporting and cutting a plant according to claim 11, wherein the base may freely rotate at least 360 degrees around the stem.

* * * * *